United States Patent
Simske et al.

(10) Patent No.: US 9,317,235 B2
(45) Date of Patent: *Apr. 19, 2016

(54) SYSTEM AND METHOD OF SORTING PRINT JOBS

(75) Inventors: Steven J. Simske, Fort Collins, CO (US); Ehud Chatow, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1894 days.

This patent is subject to a terminal disclaimer.

(21) Appl. No.: 12/558,383

(22) Filed: Sep. 11, 2009

(65) Prior Publication Data

US 2011/0063654 A1    Mar. 17, 2011

(51) Int. Cl.
*G06F 3/12* (2006.01)
*G06F 15/00* (2006.01)

(52) U.S. Cl.
CPC .............. *G06F 3/126* (2013.01); *G06F 3/1218* (2013.01); *G06F 3/1262* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 6,453,361 | B1 | 9/2002 | Morris |
| 7,148,985 | B2 | 12/2006 | Christodoulou et al. |
| 2002/0019786 | A1 | 2/2002 | Gonzalez et al. |
| 2002/0026379 | A1 | 2/2002 | Chiarabini et al. |
| 2002/0122204 | A1* | 9/2002 | Van Der Meijs ............. 358/1.15 |
| 2004/0145772 | A1* | 7/2004 | Stringham ................... 358/1.15 |
| 2005/0002058 | A1 | 1/2005 | Hirabayashi |
| 2005/0111030 | A1 | 5/2005 | Berkema et al. |
| 2005/0147440 | A1 | 7/2005 | Nakanishi et al. |
| 2007/0019228 | A1 | 1/2007 | Rai et al. |
| 2007/0019233 | A1* | 1/2007 | Rai et al. ...................... 358/1.15 |
| 2007/0236725 | A1* | 10/2007 | Harmon et al. .............. 358/1.15 |
| 2007/0274751 | A1* | 11/2007 | Ushio .......................... 399/382 |
| 2008/0204772 | A1 | 8/2008 | Kauffman |
| 2009/0055772 | A1 | 2/2009 | Huang |
| 2009/0138878 | A1* | 5/2009 | Fernstrom et al. ............ 718/102 |
| 2009/0201531 | A1 | 8/2009 | Pandit et al. |

* cited by examiner

*Primary Examiner* — Huo Long Chen
(74) *Attorney, Agent, or Firm* — Thorpe, North & Western L.L.P.

(57) ABSTRACT

The present disclosure is directed to method and systems of sorting print jobs for assignment to a plurality of printers having different printing characteristics. Print jobs can be received, sorted based on the print parameters of the print jobs, combined into print job groupings based on printing prioritizations, and sent to a plurality of printers having printing configurations that achieve the print parameters and the printing prioritizations.

19 Claims, 2 Drawing Sheets

SYSTEM AND METHOD OF SORTING PRINT JOBS

BACKGROUND

Many forms of printing have been developed that utilize a variety of printing materials, including numerous inks, toners, printing substrates, adhesives, coatings, and other specialty materials. In addition, many printing jobs have become increasingly complex. For example, a food label can require a specific barrier layer, and a certain set of adhesives and substrates that are compatible with freezers and/or microwave ovens. Printers and the required setup and maintenance of printers have increased as the complexity of such printing jobs has increased.

In many cases, the setup and maintenance of printers affect the cost of printing many types of print jobs. For example, it can be prohibitively expensive for a consumer to print small print jobs due to these setup and maintenance costs.

DETAILED DESCRIPTION

Before the present invention is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used herein, the singular forms of "a," "an," and "the" include plural referents unless the context clearly dictates otherwise. Thus, for example, reference to "a document" includes one or more of such documents, reference to "an amount of toner" includes reference to one or more amounts of toners, and reference to "the printer" includes reference to one or more printers.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The present disclosure is directed to systems and methods for sorting print jobs according to various associated print parameters, and combining these print jobs into printing groups in accordance with the print parameters and a given prioritization scheme. For example, print jobs can be sorted into print job groups based on the types of ink and media utilized in each print job. The print jobs can thus be printed in groups having similar print parameters to minimize costs associated with printer reconfiguration, low print job size, and the like.

Figure 1:
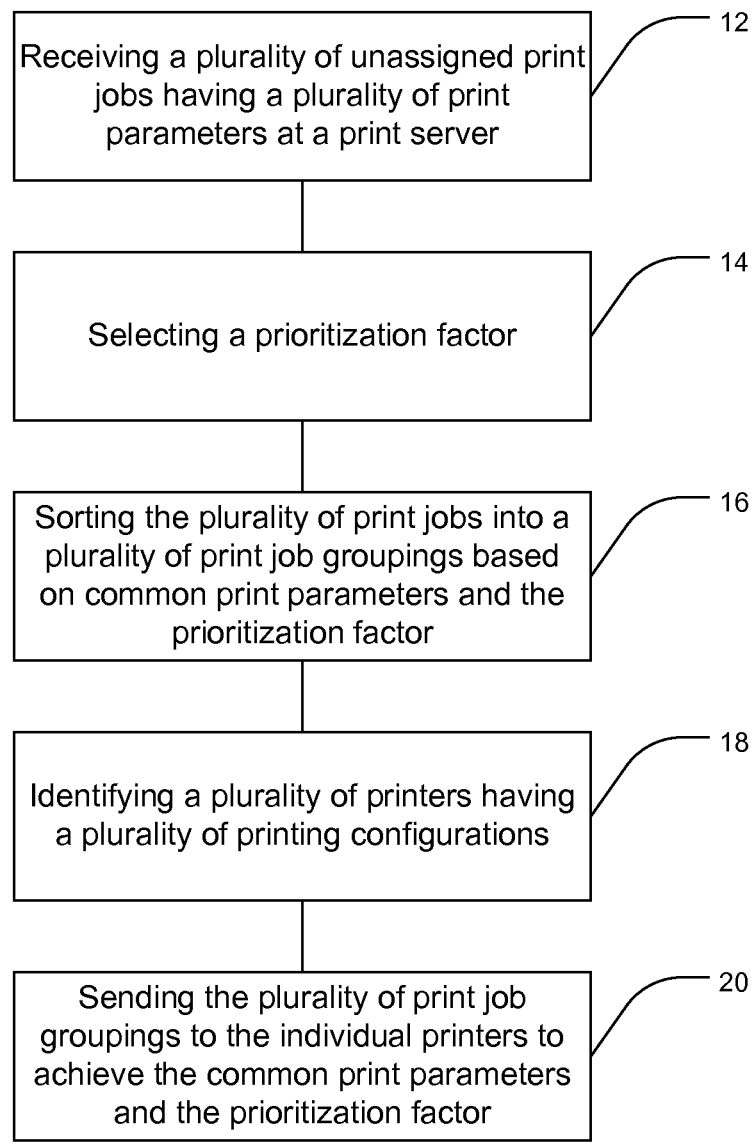
FIG. 1 depicts a method for sorting print jobs to a plurality of printers in accordance with one embodiment of the present disclosure.

Accordingly, in one aspect of the present disclosure, a method of sorting print jobs for assignment to a plurality of printers having different printing characteristics is provided. As is shown in FIG. 1, such a method can include receiving a plurality of unassigned print jobs having a plurality of print parameters at a print server 12, where individual print jobs have multiple print parameters that are represented in a portion of the plurality of print jobs. The method can also include selecting a prioritization factor 14, sorting the plurality of print jobs into a plurality of print job groupings based on common print parameters and the prioritization factor 16, and identifying a plurality of printers having a plurality of printing configurations 18, where individual printers have an established printing configuration. The plurality of print job groupings can then be sent to the individual printers to achieve the common print parameters and the prioritization factor 20. Subsequently, in another aspect the plurality of print job groupings can be printed by the individual printers.

A variety of exemplary situations are contemplated where such a method can be beneficial. In one aspect, for example, print jobs can be received, sorted, and printed at a single print service provider. Thus, incoming print jobs are sorted and printed on printers that are maintained and/or controlled by the single service provider. In these cases, the various individual printers controlled by the print service provider can have a variety of established configurations. Print jobs are sorted based on the various associated print parameters into groupings that correspond with the established printing configurations of the individual printers in order to meet the prioritization factor, or in other words, to meet a printing goal of the print service provider.

In another aspect, print jobs can be received and sorted by one entity, and sent out to various different print service providers. In this case, the incoming print jobs are sorted based on the established configurations or capabilities of the various associated print service providers. Thus, print jobs are grouped based on various common print parameters, and sent to various print service providers to achieve a prioritization factor or printing goal. In such cases, costs associated with printing can be minimized by grouping similar print jobs, particularly for those that are of a small size or have special print parameters. For example, wedding announcements can be expensive to print because they are often smaller print jobs and can be printed on specialty paper. Typical wedding announcements can also be of an unusual size. By grouping wedding announcement print jobs from different customers together, printing runs are larger, thus reducing printing costs. Additionally, further savings can be achieved by grouping wedding announcement print jobs by media and ink type.

Various methods of receiving the print jobs can vary depending on a variety of factors. For example, in one aspect the print jobs can be received from a customer at the location of the print sorting. This can occur via the physical transfer of some form of electronic media such as a flash drive, floppy disk, compact disk, DVD, and the like. Such a method can involve an exchange of the media, or in some aspects, print jobs can be uploaded to the print server by the customer at the location of the print sorting. In such "local delivery" cases, finished print jobs can be returned to the customer at the location of the print sorting, or they can be delivered at a later time.

In another aspect, customers can upload print jobs to the print server via a network connection. Such a network connection can include connections to networks such as local networks, ad hoc networks, cellular networks, the internet, and the like. Such networks can also include wired or wireless networks. Thus the print jobs can be received at the print server from such a network connection, sorted into print job groupings, and either printed locally or sent to a remote print service provider for printing and delivery back to the customer. In some aspects, the print service provider can print the print jobs and send them back to the print sorting location for subsequent delivery.

The prioritization factor can be important to the sorting of print jobs into print job groupings. The same set of print jobs can be alternatively sorted into multiple print job groupings due to the large number of possible print parameters and the various possible combinations. Non-limiting examples of such print parameters can include ink, media, printer settings, and the like. The prioritization factor allows sorting of print jobs into print job groupings that are meaningful to achieve specific printing goals. Although numerous prioritization factors are contemplated, non-limiting examples can include print job cost, print job time to completion, print job quality, print job size, print job sustainability, printing location, and combinations thereof. For example, if print job cost is selected as the prioritization factor, print jobs can be grouped into print job groupings that minimize printing costs. In one aspect this can be accomplished by grouping print jobs having similar print media and ink requirements into print job groupings for subsequent printing on individual printers or at print service providers that are configured to print such print jobs. As another example, if print job size is to be maximized as a prioritization factor, numerous smaller print jobs having similar print parameters can combined into print job groupings in order to reduce printing costs. Some delay can be incurred depending on the number of smaller print jobs having similar print parameters that are available, so such cost savings can come at a cost of time to completion of the print job. Smaller print jobs having quick turnaround requirements can be combined into common print job groupings. However, prioritizing based on print time can subsequently increase printing costs, depending on the availability of smaller print jobs.

Numerous methods of selecting the prioritization factor are contemplated. In one aspect, for example, the prioritization factor can be established prior to receiving print jobs. In another aspect, the prioritization factor can be established upon receiving and evaluating a plurality of print jobs in order to more effectively match the prioritization of printing with the various types of print jobs that have been received.

In one specific example, selecting the prioritization factor can include sorting the plurality of print jobs into alternative pluralities of print job groupings based on alternative groupings of common print parameters. In other words, the print jobs can be sorted into various alternative print job groupings to further evaluate various prioritization factors. A plurality of potential prioritization factors can be identified based on these alternative groupings of common print parameters. A prioritization factor can then be either automatically or manually selected. For manual selection, a user can be provided with the plurality of potential prioritization factors, and the resulting selected prioritization factor can then be received from the user for further sorting. In some aspects, the manual selection of the prioritization factor can be partially automated. For example, a plurality of potential prioritization factors can be identified, and one or more potential prioritization factors can be preselected and presented to the user for selection.

Numerous print parameters are contemplated that can be utilized to sort the print jobs into print job groupings. It should be noted that any parameter pertaining to printing that is capable of benefiting the sorting process should be considered to be within the present scope. In one aspect, for example, print parameters can include, without limitation, print media, inks, toners, adhesives, coatings, print area, print layout, lamination, in-line varnishing, off-line varnishing, near-line varnishing, folding, trimming, and combinations thereof. In some aspects, print parameters that that are more common may be less useful in the sorting process. For example, print jobs printed on plain media paper may or may not be useful for sorting print jobs into print job groupings, depending on the prioritization factor and the proportion of the total plurality of print jobs that are to be printed on such media. In some cases, print parameters such as adhesive printing can be used as an effective print grouping in order to send such print jobs to printers and print service providers capable of such specialty printing.

In some aspects of the present disclosure, print processes can include both printing and finishing steps. For example, a print job can require printing of ink on media, followed by a step of lamination, varnishing, folding, trimming, or the like. In one aspect, print jobs can be sorted into print job groupings based on print parameters associated with both the printing steps and the finishing steps. In another aspect, the print jobs can be sorted into print job groupings based on print parameters associated with each step separately. As such, these print jobs can be grouped by the printing steps, and then subsequently grouped by the finishing steps. In some cases, the printing steps can be accomplished, followed by a regrouping of the print jobs into new print job groupings based on finishing.

Following the determination of the various print parameters and prioritization factor or factors, the print jobs are sorted into print job groupings based on common print parameters and the selected prioritization factor(s). For example, in one aspect the sorting of print jobs can include receiving a plurality of print parameters and the selected prioritization factor at a sorting logic system that is in communication with the print server. The plurality of print jobs can then be sorted into the print job groupings based on the common print parameters of the print jobs and the prioritization factor by the sorting logic system. The sorting logic system can be fully automated, or it can include varying levels of manual control. Such manual input can be dependent on the experience of the user performing the operation. Due to the varying levels of experience of users, it is also contemplated that a sorting logic system can be fully automated with a manual override for at least a portion of the sorting process. In one aspect, the print jobs can be sorted based on a weight factor. For example, a weight factor can be applied to each of the plurality of print parameters, and the plurality of print jobs can be sorted into the plurality of print job groupings according to the weight factor.

In some cases, a user interface associated with the sorting system can provide the user with various questions to assist the process. These questions can direct a user to make appropriate sorting decisions based on the print parameters of the print jobs and the prioritization factor. For example, a specific label that goes on a food product often needs a specific barrier layer and a certain set of substrates and adhesives that are used in freezer and microwave oven situations. The selection of such can be accomplished via a guided set of questions. Thus, the user interface can map high level concerns, such as various finishing reagents, processes, quality assurance, or any other print parameters, directly to the directly to the print jobs without the user having to know the nuances of the print job, such as finishing, inspection, quality insurance, registry information, notification, and the like. As another example, a user can select a finishing type such as glossy, matte, foil, flat, etc, and the system can select the print parameters, sort the print job, and select a print service provider in order to achieve the printing preference in accordance with the prioritization factor.

As has been described, in one aspect the plurality of print jobs can be sorted into alternative pluralities of print job groupings based, at least in part, on alternative groupings of common print parameters. The final print job groupings can then be selected according to the prioritization factor. In some cases, the user-guided interface described above can be used to facilitate the selection of the final print job groupings through a series of directed questions.

The plurality of printers can have a variety of established printing configurations. Such configurations can be permanent configurations or they can be temporary reconfigurable printing configurations. In those aspects where the present methods are performed at a single printing location, established printing configurations can include configurations of individual printers at that location. For example, printers can be configured for photo printing, text printing, adhesive printing, specialty ink printing, and the like. In such cases, the sorting of the print jobs into print job groupings can be accomplished to minimize reconfiguration of the existing printer pool.

In aspects where print jobs are received at a central location, sorted, and sent out to a plurality of print service providers, established printing configurations can include the printing configurations of printers at a given print service provider, or they can include a printing configuration of the print service provider as a whole. For example, certain print service providers may specialize in specialty inks, or adhesives, and by sending such print job groupings to these providers can result in lower costs and better quality work. Additionally, the configuration of the print service provider can change over time. For example, a given print service provider may be low on work, so print job groupings that need to be printed in a timely manner can be sent to such a provider for faster turnaround.

Figure 2:
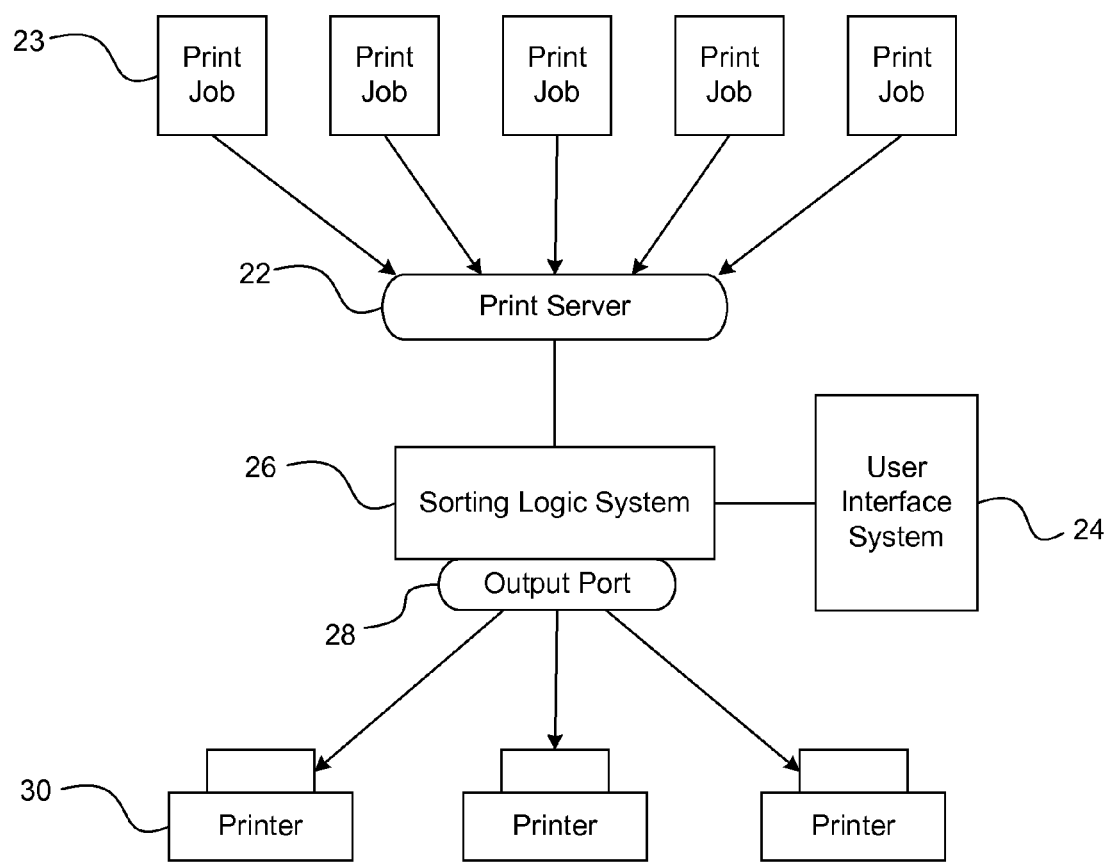
FIG. 2 depicts a system for sorting print jobs to a plurality of printers in accordance with another embodiment of the present disclosure.

The present disclosure additionally provides systems for sorting print jobs to a plurality of printers having different printing characteristics. As is shown in FIG. 2, such a system can include a print server 22 that is operable to receive a plurality of print jobs 23, where the print jobs have multiple print parameters. The system can also include a user interface system 24 that is configured to receive a prioritization factor, and a sorting logic system 26 that is in communication with the print server and the user interface system. The sorting logic system is operable to sort the plurality of print jobs into a plurality of print job groupings based on common print parameters and the prioritization factor. The method can also include an output port 28 operable to be in communication with a plurality of printers 30 having a plurality of established printing configurations. The sorting logic system is operable to identify the plurality of established printing configurations and to send the plurality of print job groupings to the plurality of printers based on the common print parameters and the prioritization factor.

The output port 28 can vary depending on the system configuration and the location of the plurality of printers. For example, in one aspect, the output port is operable to communicate with a plurality of printers via a local network connection. Such a local network connection can be wired, wireless, cellular, or any other type of known network connection. Such a local network is often utilized when the individual printers are located on site where the print job sorting is occurring. In another aspect, the output port is operable to communicate with a plurality of printers via an internet connection. In such cases, the print jobs are sorted into print job groupings by the sorting logic system, and the resulting print job groupings are sent via an internet connection to remote print service providers. It is also contemplated that the print job groupings can be sent to remote print service providers by other networks, such as cellular, satellite, cable, etc.

The sorting logic system is operable to retrieve the print jobs from the print server in order to form print job groupings for subsequent printing. In one aspect, the sorting logic system can retrieve all or substantially all of the print jobs that are resident on the print server. In such a case, the sorting logic system can sort all or substantially all of the print jobs into print job groupings for printing. As the print job groupings are sent on to be printed, any ungrouped print jobs can be retained by the sorting logic system, or they can be returned to the print server. In another aspect, the sorting logic system can retrieve print jobs from the print server as each print job is identified as belonging to a given print job grouping. These print jobs can be retrieved from the print server and sorted into groups as they are identified. Once a print job grouping is of a sufficient size, it can be sent to a printer or a print service provider to be printed.

The user interface system can vary widely depending on the complexity of the print sorting system. In one aspect, for example, a predominantly automated system can merely receive the prioritization factor from the user and implement the retrieval of print jobs from the print server, sorting, grouping, and delivery to a printer or print service provider with little or any further interaction by the user. In another aspect, the user interface can query the print jobs on the print server and provide a series of questions as to how the print jobs are to be sorted. In some aspects, the prioritization factor can be generated by the user interface based on the answer to such questions. In other aspects, the user interface can present the user with a plurality of potential prioritization factors, either through an automated process or as a result of directed questioning, from which the prioritization factor or factors are selected. Regardless of how it is generated, the prioritization factor is sent to the sorting logic system to facilitate grouping of print jobs into print job groupings.

While the disclosure has been described with reference to certain preferred embodiments, those skilled in the art will appreciate that various modifications, changes, omissions, and substitutions can be made without departing from the spirit of the disclosure. It is therefore intended that the invention be limited only by the scope of the appended claims.

What is claimed is:

1. A method of sorting print jobs for assignment to a plurality of printers having different printing characteristics, comprising:
    receiving a plurality of unassigned print jobs having a plurality of print parameters at a print server, wherein individual print jobs have multiple print parameters being represented in a portion of the plurality of print jobs;
    selecting a prioritization factor including a member selected from the group of print job cost, print job time to completion, print job quality, print job size, print job sustainability, printing location, and combinations thereof;

sorting the plurality of print jobs into a plurality of print job groupings based on common print parameters and the prioritization factor;

identifying a plurality of printers having a plurality of printing configurations, such that individual printers have an established printing configuration; and sending the plurality of print job groupings to the individual printers to achieve the common print parameters and the prioritization factor.

2. The method of claim 1, further comprising printing the plurality of print job groupings.

3. The method of claim 1, wherein the plurality of printers are individual printers at a plurality of print service providers.

4. The method of claim 1, wherein the plurality of printers are individual printers at a single print service provider.

5. The method of claim 1, wherein the established printing configuration is a reconfigurable printing configuration.

6. The method of claim 1, wherein print parameters includes a member selected from the group consisting of print media, inks, toners, adhesives, coatings, print area, print layout, lamination, in-line varnishing, off-line varnishing, nearline varnishing, folding, trimming, and combinations thereof.

7. The method of claim 1, wherein sorting the plurality of print jobs further includes:

receiving the plurality of print parameters and the prioritization factor at a sorting logic system in communication with the print server; and sorting the plurality of print jobs into the print job groupings based on the common print parameters of the print jobs and the prioritization factor by the sorting logic system.

8. The method of claim 7, wherein sorting the plurality of print jobs further includes:

applying a weight factor to each of the plurality of print parameters; and sorting the plurality of print jobs into the plurality of print job groupings according to the weight factor.

9. The method of claim 1, wherein sorting the plurality of print jobs further includes:

sorting the plurality of print jobs into alternative pluralities of print job groupings based on alternative groupings of common print parameters; and selecting the plurality of print job groupings according to the prioritization factor.

10. The method of claim 1, wherein selecting the prioritization factor further includes:

sorting the plurality of print jobs into alternative pluralities of print job groupings based on alternative groupings of common print parameters;

identifying a plurality of potential prioritization factors that are possible based on the alternative groupings of common print parameters;

providing to a user the plurality of potential prioritization factors; and receiving the prioritization factor selected by the user.

11. The method of claim 10, further comprising prompting the user with a preferred potential prioritization factor based on the alternative groupings of common print parameters.

12. The method of claim 1, wherein sorting the plurality of print jobs into the plurality of print job groupings further includes sorting the plurality of print jobs into print job groupings based on common print parameters associated with printing steps and based on common print parameters associated with finishing steps.

13. The method of claim 12, wherein the plurality of print jobs are sorted into print job groupings based on common print parameters associated with printing steps, and then the plurality of print jobs are sorted into print job groupings based on common print parameters associated with finishing steps.

14. The method of claim 13, wherein the print job groupings based on common print parameters associated with printing steps are printed prior to sorting the plurality of print jobs into print job groupings based on common print parameters associated with finishing steps.

15. A system for sorting print jobs for assignment to a plurality of printers having different printing characteristics, comprising:

a print server operable to receive a plurality of print jobs, the print jobs having multiple print parameters;

a user interface system configured to receive a prioritization factor including a member selected from the group of print job cost, print job time to completion, print job quality, print job size, print job sustainability, printing location, and combinations thereof;

a sorting logic system in communication with the print server and the user interface system, the sorting logic system being operable to sort the plurality of print jobs into a plurality of print job groupings based on common print parameters and the prioritization factor; and an output port operable to be in communication with a plurality of printers having a plurality of established printing configurations, wherein the sorting logic system is operable to identify the plurality of established printing configurations and to send the plurality of print job groupings to the plurality of printers based on the common print parameters and the prioritization factor.

16. The system of claim 15, wherein the output port is operable to communicate with a plurality of printers via a local network connection.

17. The system of claim 15, wherein the output port is operable to communicate with a plurality of printers via an internet connection.

18. The system of claim 15, wherein the print server is operable to receive the plurality of print jobs via a local network connection.

19. The system of claim 15, wherein the print server is operable to receive the plurality of print jobs via an internet connection.

* * * * *